(No Model.)
M. G. GRIFFIN.
Device for Emptying Tea out of the Original Tea Chests.
No. 235,082.　　　　　　Patented Dec. 7, 1880.
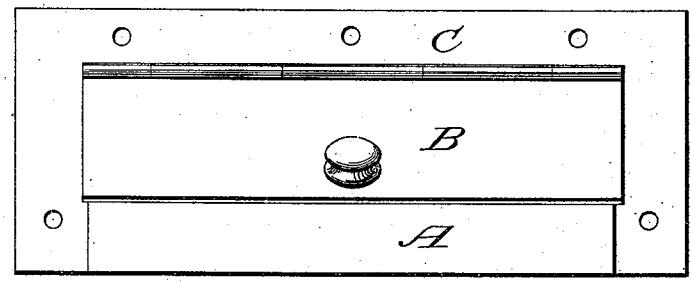
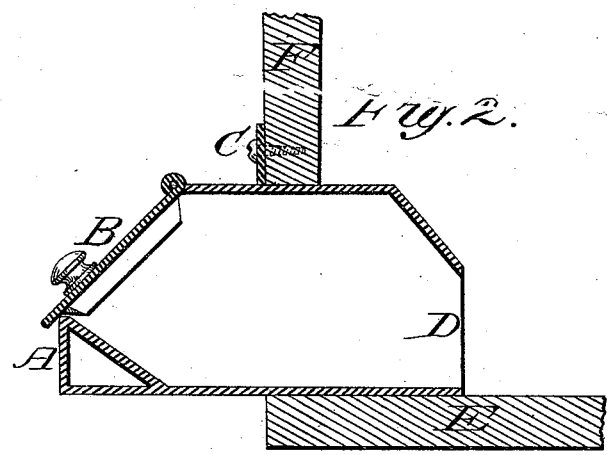
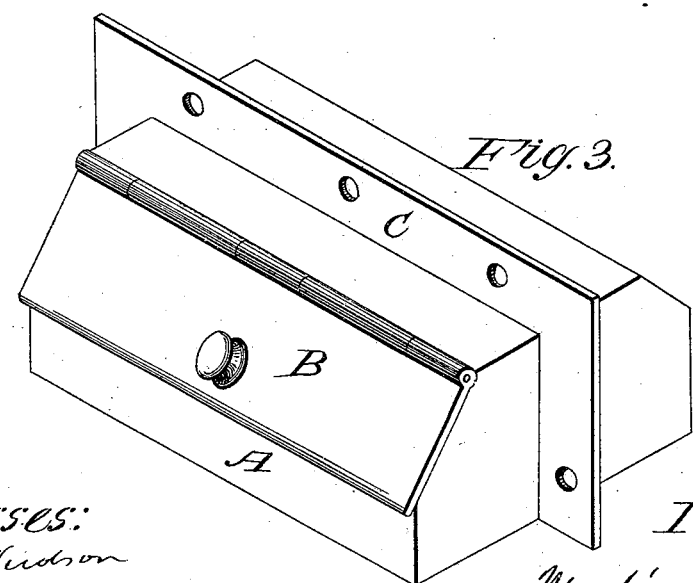
Witnesses:
Phil Judson
J. T. Brebeck
Inventor:
Martin G. Griffin

UNITED STATES PATENT OFFICE.

MARTIN G. GRIFFIN, OF COUNCIL BLUFFS, IOWA.

DEVICE FOR EMPTYING TEA OUT OF THE ORIGINAL TEA-CHESTS.

SPECIFICATION forming part of Letters Patent No. 235,082, dated December 7, 1880.

Application filed June 2, 1880. (No model.)

To all whom it may concern:

Be it known that I, MARTIN GERALD GRIFFIN, of Council Bluffs, in the county of Pottawattamie and State of Iowa, have invented a new and Improved Device for Emptying Tea Out of the Original Tea-Chest, of which the following is a specification.

The invention relates to a device, made of tin or other suitable material, to be attached to a tea-chest, over an opening cut for the purpose, for taking out the tea when filling orders at retail or at other times, as may be desired.

Heretofore teas have been emptied into costly tea-canisters, or as required from the original chest by breaking a hole through the cover. The first method is objectionable, because it entails much cost of time, waste of teas, and expensive tea-canisters. The second method is objectionable, because the tea thereby is exposed to dust, which lessens its value, and also causes the tea-chests to break asunder when the outer matting is cut open. Both methods are objectionable, because by either one the tea is exposed to the action of the air, which causes it to lose much of its original strength and natural flavor.

Tea-chests are lined with sheet-lead to preserve the flavor and strength of the tea contained therein. Hence the advantage of retailing teas from the original packages if the air and dust are kept therefrom.

The object of my invention is to provide a device for the purpose of retailing or emptying tea from the original tea-chest, thereby saving time, waste of tea, expensive tea-canisters, and original strength and natural flavor of tea. I attain these objects by the device or tea-preserver illustrated in the accompanying drawings, in which—

Figure 1 is a front view as it appears when attached to original tea-chest; Fig. 2, a sectional view; and Fig. 3 is a perspective view.

A shows the perpendicular front of preserver. By opening the lid B the tea can be conveniently scooped out. By cutting a hole through front of tea-chest F the preserver is fitted in at or near bottom of chest E by means of screws through flange C. The preserver opens into the tea-chest at D, through which opening the tea conveniently falls into the preserver, thereby affording a simple and convenient canister.

What I claim as my invention, and desire to secure by Letters Patent, is—

The caddy or canister provided in its exterior with a flange, said caddy being adapted to be inserted within an aperture cut into the original chest, and secured thereto by means of the said flange and thumb-screws or similar fastenings, substantially as described.

MARTIN GERALD GRIFFIN.

Witnesses:
JNO. JAY FRAINE,
THEORDORE GUITTAR.